US011909253B2

(12) United States Patent
Mitani et al.

(10) Patent No.: US 11,909,253 B2
(45) Date of Patent: Feb. 20, 2024

(54) POWER SUPPLY CIRCUIT

(71) Applicant: HONDA MOTOR CO., LTD., Tokyo (JP)

(72) Inventors: Manabu Mitani, Wako (JP); Akinori Kita, Wako (JP); Sadao Shinohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/592,549

(22) Filed: Feb. 4, 2022

(65) Prior Publication Data
US 2022/0263337 A1 Aug. 18, 2022

(30) Foreign Application Priority Data

Feb. 16, 2021 (JP) .................. 2021-022460

(51) Int. Cl.
*H02J 9/00* (2006.01)
*H02J 7/34* (2006.01)
*H02J 7/00* (2006.01)

(52) U.S. Cl.
CPC .......... *H02J 9/002* (2013.01); *H02J 7/00038* (2020.01); *H02J 7/0048* (2020.01); *H02J 7/0063* (2013.01); *H02J 7/345* (2013.01); *H02J 2207/50* (2020.01)

(58) Field of Classification Search
CPC ...... H02J 9/002; H02J 7/00038; H02J 7/0048; H02J 7/0063; H02J 7/345; H02J 2207/50; H02J 1/086; H02J 7/0013; H02J 7/34
See application file for complete search history.

(56) References Cited

U.S. PATENT DOCUMENTS

2014/0028088 A1* 1/2014 Salziger ............. G01R 27/2605
  702/65
2021/0050740 A1* 2/2021 Satake .................... H02H 7/268
2021/0328439 A1* 10/2021 Atmur ................... H02J 7/0031

FOREIGN PATENT DOCUMENTS

JP 2014-143863 8/2014
JP 2014-182679 9/2014

* cited by examiner

*Primary Examiner* — Lincoln D Donovan
*Assistant Examiner* — Alex W Lam
(74) *Attorney, Agent, or Firm* — Amin, Turocy & Watson, LLP

(57) ABSTRACT

A power supply circuit supplies power from a first battery to a first load. The first load includes a capacitor that needs to be charged before activation. The power supply circuit includes: a main circuit that supplies power from the first battery to the first load; and a backup circuit having a precharge circuit for charging the capacitor and that supplies power from the first battery to the first load. When charging the capacitor, power is supplied from the first battery to the first load by using the backup circuit. After charging of the capacitor is completed, power is supplied from the first battery to the first load by using the main circuit.

8 Claims, 13 Drawing Sheets

FIG. 13

POWER SUPPLY CIRCUIT

CROSS-REFERENCE TO RELATED APPLICATIONS

This application is based upon and claims the benefit of priority from Japanese Patent Application No. 2021-022460 filed on Feb. 16, 2021, the contents of which are incorporated herein by reference.

BACKGROUND OF THE INVENTION

Field of the Invention

The present invention relates to a power supply circuit for supplying power from a power source to a load.

Description of the Related Art

JP 2014-143863 A discloses a power supply device for a vehicle. The vehicle power supply device includes a positive contactor, a negative contactor, a precharge contactor, and a precharge resistor. The positive contactor is provided on a positive line connecting a positive terminal of a high-voltage battery and a connection terminal of an inverter. The negative contactor is provided on a negative line that connects a negative terminal of the high-voltage battery and a connection terminal of the inverter. The pre-charge contactor is connected in parallel to the positive contactor. The precharge resistor is connected in series with the precharge contactor.

JP 2014-182679 A discloses a midplane. The midplane includes two power supply buses for supplying power from each power supply unit to each module.

SUMMARY OF THE INVENTION

In a case of providing the precharge contactor described in JP 2014-143863 A in the power supply circuit described in JP 2014-182679 A, it is necessary to provide a precharge contactor for each power supply bus. In such a case, there is a problem of increasing the weight of the power supply circuit.

The present invention has been made to solve the above-described problem, and an object thereof is to provide a power supply circuit capable of achieving weight reduction.

According to an aspect of the present invention, there is provided a power supply circuit for supplying power from a power source to a load, wherein the load includes a capacitor that needs to be charged before activation, the power supply circuit including: a first circuit configured to supply power from the power source to the load; a second circuit configured to supply power from the power source to the load; wherein: only one of either the first circuit or the second circuit is provided with a precharge circuit configured to charge the capacitor; when charging the capacitor, power is supplied from the power source to the load by using a circuit that is provided with the precharge circuit among the first circuit and the second circuit; and after charging of the capacitor is completed, power is supplied from the power source to the load by using a circuit that is not provided with the precharge circuit among the first circuit and the second circuit.

According to the present invention, the weight of the power supply circuit can be reduced.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 13 is a circuit diagram of a power supply circuit.

DESCRIPTION OF THE INVENTION

First Embodiment

Figure 1:
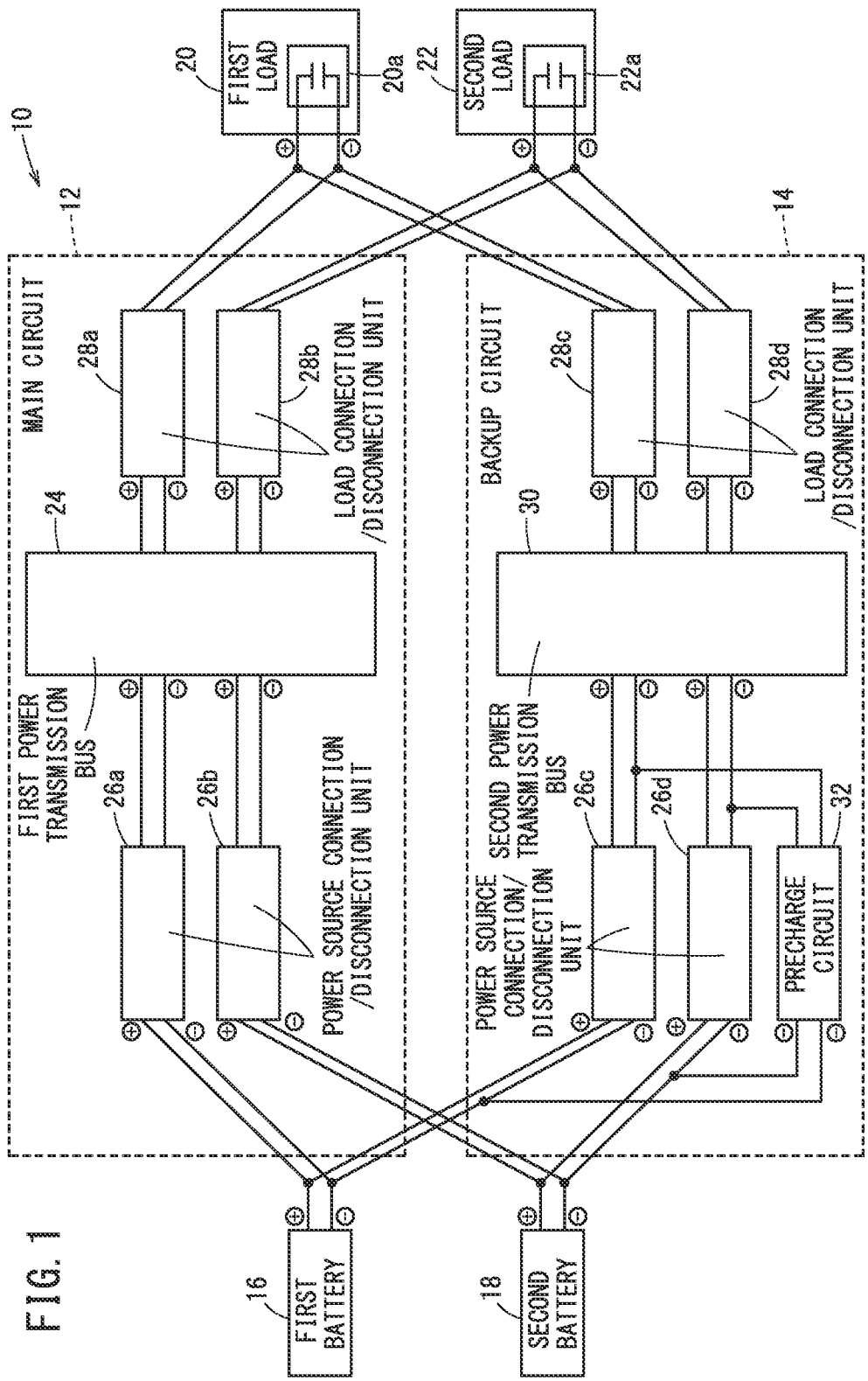
FIG. 1 is a circuit diagram of a power supply circuit.

FIG. 1 is a circuit diagram showing a power supply circuit 10 according to the present embodiment. The power supply circuit 10 includes a main circuit 12 and a backup circuit 14. The main circuit 12 supplies electric power output from each of a first battery 16 and a second battery 18 to a first load 20 and a second load 22. The backup circuit 14 supplies electric power output from each of the first battery 16 and the second battery 18 to the first load 20 and the second load 22. The first load 20 has a capacitor 20a therein. In the first load 20, the capacitor 20a needs to be charged (precharged) when the first load 20 is activated. The second load 22 has a capacitor 22a therein. In the second load 22, the capacitor 22a needs to be charged (precharged) when the second load 22 is activated.

The main circuit 12 corresponds to a first circuit of the present invention. The backup circuit 14 corresponds to a second circuit of the present invention. The first battery 16 and the second battery 18 correspond to power sources of the present invention. The first load 20 and the second load 22 correspond to loads of the present invention.

The main circuit 12 includes a first power transmission bus 24. The first power transmission bus 24 is constituted by a bus bar, an electric wire, and the like. The first power transmission bus 24 may include a fuse, a switch, or the like for circuit protection.

A power source connection/disconnection unit 26a is provided in a wiring connecting the first battery 16 and the first power transmission bus 24. The power source connection/disconnection unit 26a switches between a state in which the first battery 16 and the first power transmission bus 24 are electrically connected and a state in which the first battery 16 and the first power transmission bus 24 are electrically disconnected. A power source connection/disconnection unit 26b is provided in a wiring that connects the second battery 18 and the first power transmission bus 24. The power source connection/disconnection unit 26b switches between a state in which the second battery 18 and the first power transmission bus 24 are electrically connected and a state in which the second battery 18 and the first power transmission bus 24 are electrically disconnected. A load connection/disconnection unit 28a is provided in a wiring connecting the first power transmission bus 24 and the first load 20. The load connection/disconnection unit 28a switches between a state in which the first power transmission bus 24 and the first load 20 are electrically connected and a state in which the first power transmission bus 24 and the first load 20 are electrically disconnected. A load connection/disconnection unit 28b is provided in a wiring connecting the first power transmission bus 24 and the second load 22. The load connection/disconnection unit 28b switches between a state in which the first power transmission bus 24 and the second load 22 are electrically connected and a state in which the first power transmission bus 24 and the second load 22 are electrically disconnected.

The backup circuit 14 includes a second power transmission bus 30. The second power transmission bus 30 is constituted by a bus bar, an electric wire, or the like. The backup circuit 14 may have a fuse or a switch for circuit protection.

A power source connection/disconnection unit 26c is provided in a wiring that connects the first battery 16 and the second power transmission bus 30. The power source connection/disconnection unit 26c switches between a state in which the first battery 16 and the second power transmission bus 30 are electrically connected and a state in which the first battery 16 and the second power transmission bus 30 are electrically disconnected. A power source connection/disconnection unit 26d is provided in a wiring connecting the second battery 18 and the second power transmission bus 30. The power source connection/disconnection unit 26d switches between a state in which the second battery 18 and the second power transmission bus 30 are electrically connected and a state in which the second battery 18 and the second power transmission bus 30 are electrically disconnected. A load connection/disconnection unit 28c is provided in a wiring connecting the second power transmission bus 30 and the first load 20. The load connection/disconnection unit 28c switches between a state in which the second power transmission bus 30 and the first load 20 are electrically connected and a state in which the second power transmission bus 30 and the first load 20 are electrically disconnected. A load connection/disconnection unit 28d is provided in a wiring connecting the second power transmission bus 30 and the second load 22. The load connection/disconnection unit 28d switches between a state in which the second power transmission bus 30 and the second load 22 are electrically connected and a state in which the second power transmission bus 30 and the second load 22 are electrically disconnected. A precharge circuit 32 is connected in parallel with the power source connection/disconnection units 26c and 26d.

Hereinafter, when the power source connection/disconnection units 26a, 26b, 26c, and 26d are not particularly distinguished from each other, they are described as the power source connection/disconnection units 26. When the load connection/disconnection units 28a, 28b, 28c, and 28d are not particularly distinguished from each other, they are referred to as the load connection/disconnection units 28.

Figure 2:
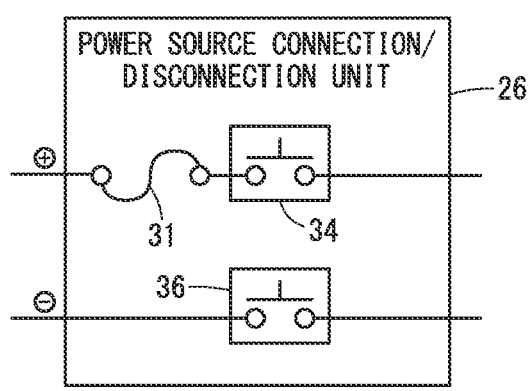
FIG. 2 is a diagram showing a circuit configuration of a power source connection/disconnection unit.

FIG. 2 is a diagram showing a circuit configuration of the power source connection/disconnection unit 26. As shown in FIG. 2, a fuse 31 and a switch 34 are provided in series on the positive wiring of the power source connection/disconnection unit 26. As shown in FIG. 2, a switch 36 is provided on the negative wiring of the power source connection/disconnection unit 26.

When at least one of the switch 34 or the switch 36 is OFF, the power source connection/disconnection unit 26a electrically disconnects the first battery 16 and the first power transmission bus 24 from each other. When at least one of the switch 34 or the switch 36 is OFF, the power source connection/disconnection unit 26b electrically disconnects the second battery 18 from the first power transmission bus 24. When at least one of the switch 34 or the switch 36 is OFF, the power source connection/disconnection unit 26c electrically disconnects the first battery 16 and the second power transmission bus 30 from each other. When at least one of the switch 34 or the switch 36 is OFF, the power source connection/disconnection unit 26d electrically disconnects the second battery 18 from the second power transmission bus 30.

When both the switch 34 and the switch 36 are ON, the power source connection/disconnection unit 26a electrically connects the first battery 16 and the first power transmission bus 24. When both the switch 34 and the switch 36 are ON, the power source connection/disconnection unit 26b electrically connects the second battery 18 and the first power transmission bus 24. When both the switch 34 and the switch 36 are ON, the power source connection/disconnection unit 26c electrically connects the first battery 16 and the second power transmission bus 30. When both the switch 34 and the switch 36 are ON, the power source connection/disconnection unit 26d electrically connects the second battery 18 and the second power transmission bus 30.

Figure 3A:
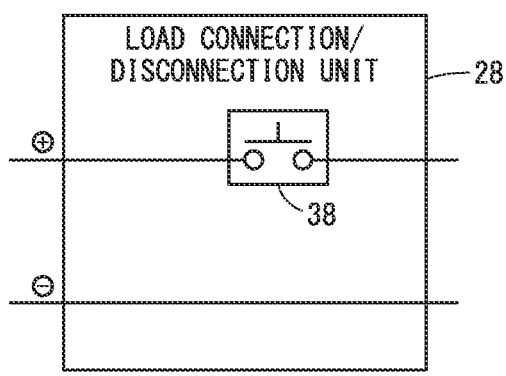
FIGS. 3A, 3B, and 3C are diagrams illustrating the circuit configuration of a load connection/disconnection unit.
Figure 3B:
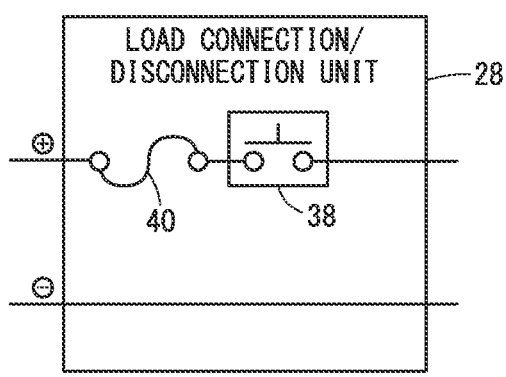
Figure 3C:
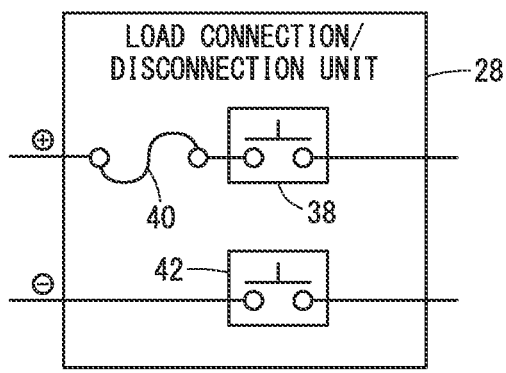

FIGS. 3A, 3B, and 3C are diagrams illustrating the circuit configuration of the load connection/disconnection unit 28. In the load connection/disconnection unit 28, a switch 38 is provided on the wiring on the positive terminal side (positive wiring) as shown in FIG. 3A.

When the switch 38 is OFF, the load connection/disconnection unit 28a electrically disconnects the first power transmission bus 24 and the first load 20 from each other. When the switch 38 is OFF, the load connection/disconnection unit 28b electrically disconnects the first power transmission bus 24 from the second load 22. When the switch 38 is OFF, the load connection/disconnection unit 28c electrically disconnects the second power transmission bus 30 from the first load 20. When the switch 38 is OFF, the load connection/disconnection unit 28d electrically disconnects the second power transmission bus 30 from the second load 22.

When the switch 38 is ON, the load connection/disconnection unit 28a electrically connects the first power transmission bus 24 and the first load 20. When the switch 38 is ON, the load connection/disconnection unit 28b electrically connects the first power transmission bus 24 and the second load 22. When the switch 38 is ON, the load connection/disconnection unit 28c electrically connects the second power transmission bus 30 and the first load 20. When the switch 38 is ON, the load connection/disconnection unit 28d electrically connects the second power transmission bus 30 and the second load 22.

The circuit configuration of the load connection/disconnection unit 28 is not limited to the configuration shown in FIG. 3A, and may be another configuration. In the load connection/disconnection unit 28, a fuse 40 and a switch 38 may be provided in series on the positive wiring as shown in FIG. 3B. In addition, the load connection/disconnection unit 28 may be provided with a switch 42 on the wiring on the negative terminal side (negative wiring) as illustrated in FIG. 3C.

Figure 4A:
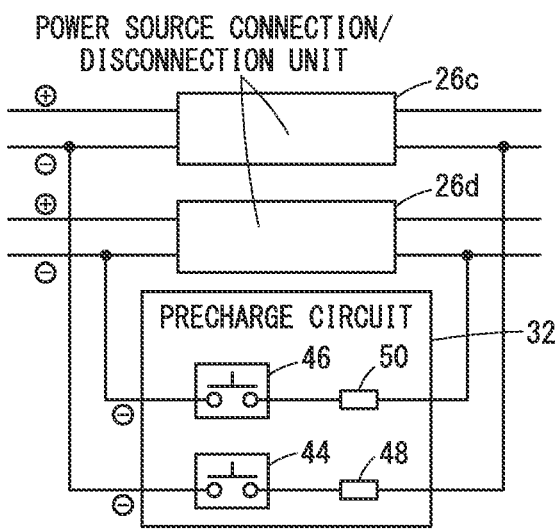
FIGS. 4A, 4B, and 4C are diagrams illustrating the circuit configuration of a precharge circuit.
Figure 4B:
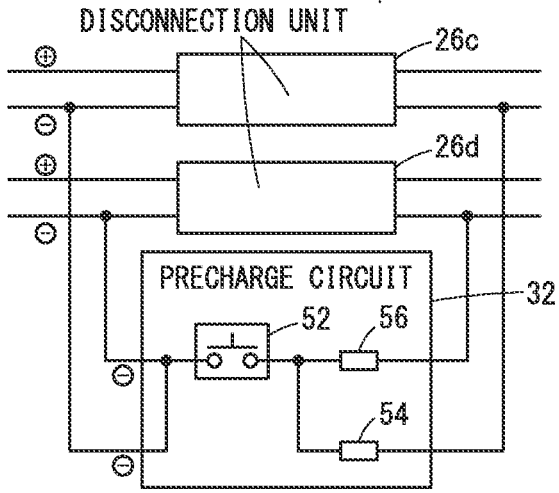
Figure 4C:
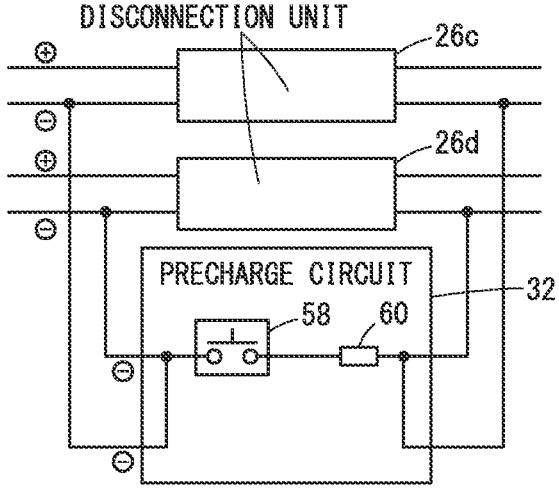

FIGS. 4A, 4B, and 4C are diagrams illustrating the circuit configuration of the precharge circuit 32. The precharge circuit 32 has a switch 44, a switch 46, a resistor 48, and a resistor 50 as shown in FIG. 4A. The switch 44 is connected in parallel with the power source connection/disconnection unit 26c. The switch 46 is connected in parallel with the power source connection/disconnection unit 26d. The resistor 48 is connected in parallel with the power source connection/disconnection unit 26c. The resistor 48 and the switch 44 are connected in series. The resistor 50 is connected in parallel with power source connection/disconnection unit 26d. The resistor 50 is connected in series with the switch 46.

When the switch 34 (see FIG. 2) provided in the power source connection/disconnection unit 26c is ON, the switch 36 (see FIG. 2) is OFF, and the switch 44 provided in the precharge circuit 32 is ON, the first battery 16 is electrically connected to the second power transmission bus 30 via the precharge circuit 32. When the switch 34 (see FIG. 2) provided in the power source connection/disconnection unit 26d is ON, the switch 36 (see FIG. 2) is OFF, and the switch 46 provided in the precharge circuit 32 is ON, the second battery 18 is electrically connected to the second power transmission bus 30 via the precharge circuit 32.

The circuit configuration of the precharge circuit 32 is not limited to the configuration shown in FIG. 4A, and may be another configuration. The precharge circuit 32 may have a circuit configuration shown in FIG. 4B. The precharge circuit 32 shown in FIG. 4B includes a switch 52, a resistor 54, and a resistor 56. The switch 52 is connected in parallel with the power source connection/disconnection unit 26c and the power source connection/disconnection unit 26d. The resistor 54 is connected in parallel with the power source connection/disconnection unit 26c and in series with the switch 52. The resistor 56 is connected in parallel with the power source connection/disconnection unit 26d and in series with the switch 52.

The precharge circuit 32 may have a circuit configuration shown in FIG. 4C. The precharge circuit 32 includes a switch 58 and a resistor 60. The switch 58 is connected in parallel with the power source connection/disconnection unit 26c and the power source connection/disconnection unit 26d. The resistor 60 is connected in parallel with the power source connection/disconnection unit 26c and the power source connection/disconnection unit 26d and in series with the switch 58.

Figure 5:
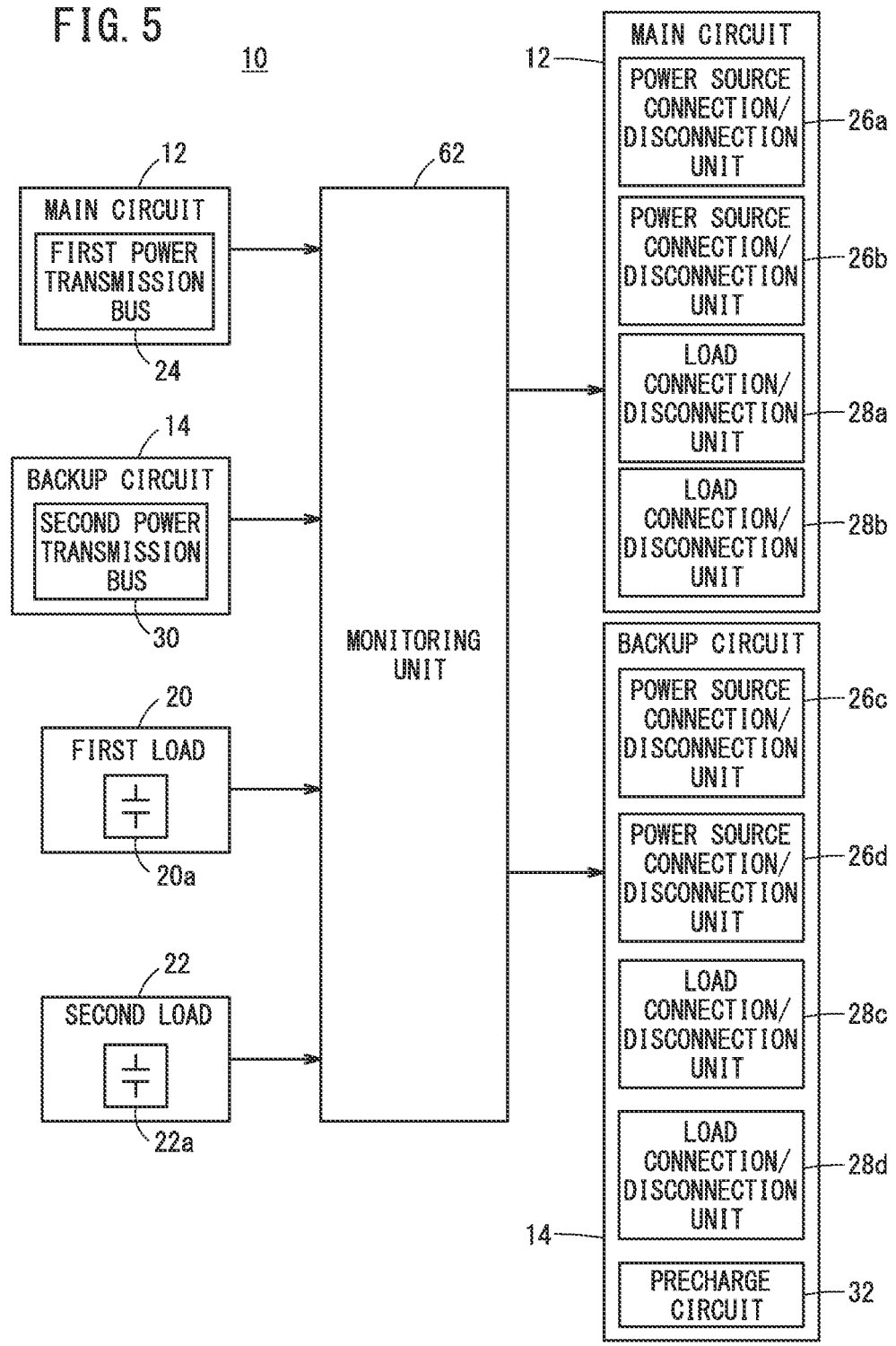
FIG. 5 is a block diagram of the power supply circuit.

FIG. 5 is a block diagram of the power supply circuit 10. The power supply circuit 10 includes a monitoring unit 62. The monitoring unit 62 monitors an abnormality of the main circuit 12 and the backup circuit 14. Examples of the abnormality of the main circuit 12 include short-circuiting of a bus bar, an electric wire, or the like in the first power transmission bus 24, blowout of a fuse in the first power transmission bus 24, ON-sticking failure or OFF-sticking failure of a switch in the first power transmission bus 24, and the like. Examples of the abnormality of the backup circuit 14 include short-circuiting of a bus bar, an electric wire, or the like in the second power transmission bus 30, blowout of a fuse in the second power transmission bus 30, ON-sticking failure or OFF-sticking failure of a switch in the second power transmission bus 30, and the like. The monitoring unit 62 monitors the charging state of the capacitor 20a of the first load 20 and the capacitor 22a of the second load 22. The monitoring unit 62 controls the power source connection/disconnection unit 26, the load connection/disconnection unit 28, and the precharge circuit 32.

The monitoring unit 62 includes a calculation unit and a determination unit (not illustrated). The calculation unit and the determination unit can be realized by, for example, a processing circuitry. The processing circuitry may be configured by an integrated circuit such as an application specific integrated circuit (ASIC) or a field-programmable gate array (FPGA). Further, the processing circuitry may be configured by an electronic circuit including discrete devices or elements.

The processing circuitry may be configured by a processor such as a central processing unit (CPU) or a graphics processing unit (GPU). In this case, a processing circuitry can be realized by a processor executing a program stored in a storage unit (not illustrated).

[Power Supply During Precharging]

When the capacitor 20a provided in the first load 20 and the capacitor 22a provided in the second load 22 are charged (hereinafter referred to as "during precharging" or "at the time of precharging), the monitoring unit 62 controls the power source connection/disconnection units 26a and 26b and the load connection/disconnection units 28a and 28b of the main circuit 12 to establish the following state: The monitoring unit 62 electrically disconnects the first battery 16 and the second battery 18 from the first power transmission bus 24; and the monitoring unit 62 electrically disconnects the first load 20 and the second load 22 from the first power transmission bus 24.

During precharging, the monitoring unit 62 controls the power source connection/disconnection units 26c and 26d, the load connection/disconnection units 28c and 28d, and the precharge circuit 32 of the backup circuit 14 to establish the following state: The monitoring unit 62 electrically connects the first battery 16 and the second battery 18 to the second power transmission bus 30 via the precharge circuit 32; and the monitoring unit 62 electrically connects the first load 20 and the second load 22 to the second power transmission bus 30.

As a result, during precharging, the power supply circuit 10 supplies power from the first battery 16 and the second battery 18 to the first load 20 and the second load 22, via the backup circuit 14. At this time, the current flowing between each of the first battery 16 and the second battery 18, and the first load 20 and the second load 22 passes through the precharge circuit 32.

As shown in FIGS. 4A, 4B, and 4C, the precharge circuit 32 has a resistor. The voltage drop across the resistor of the precharge circuit 32 can reduce the voltage applied to the capacitor 20a of the first load 20 and the capacitor 22a of the second load 22. Accordingly, it is possible to suppress a large current from flowing through the capacitor 20a and the capacitor 22a. Therefore, the capacitor 20a of the first load 20 and the capacitor 22a of the second load 22 can be charged without damaging the capacitor 20a and the capacitor 22a.

[Power Supply after Precharging]

After the capacitor 20a of the first load 20 and the capacitor 22a of the second load 22 have been charged (hereinafter, described as "after precharging"), the monitoring unit 62 controls the power source connection/disconnection units 26a and 26b and the load connection/disconnection units 28a and 28b of the main circuit 12 to establish a state described below. The monitoring unit 62 electrically connects the first battery 16 and the second battery 18 to the first power transmission bus 24; and the monitoring unit 62 electrically connects the first load 20 and the second load 22 to the first power transmission bus 24.

After precharging, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically disconnects the first battery 16 and the second battery 18 from the second power transmission bus 30; and the monitoring unit 62 electrically disconnects the first load 20 and the second load 22 from the second power transmission bus 30.

Thus, after precharging, the power supply circuit 10 supplies power from the first battery 16 and the second battery 18 to the first load 20 and the second load 22, via the main circuit 12. The current flowing between each of the first battery 16 and the second battery 18, and the first load 20 and the second load 22 does not pass through the precharge circuit 32. Therefore, the voltage applied to the first load 20 and the second load 22 can be increased. As a result, the first load 20 and the second load 22 can be driven.

[Power Supply During Precharging in Case of Occurrence of Abnormality in Main Circuit]

During precharging when an abnormality has occurred in the main circuit 12, the monitoring unit 62 controls the power source connection/disconnection units 26a and 26b and the load connection/disconnection units 28a and 28b of the main circuit 12 to establish the following state: The monitoring unit 62 electrically disconnects the first battery 16 and the second battery 18 from the first power transmission bus 24; and the monitoring unit 62 electrically disconnects the first load 20 and the second load 22 from the first power transmission bus 24.

During precharging when an abnormality has occurred in the main circuit 12, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically connects the first battery 16 and the second battery 18 to the second power transmission bus 30 via the precharge circuit 32; and the monitoring unit 62 electrically connects the first load 20 and the second load 22 to the second power transmission bus 30.

Thus, during precharging when an abnormality has occurred in the main circuit 12, the power supply circuit 10 supplies power from the first battery 16 and the second battery 18 to the first load 20 and the second load 22, via the backup circuit 14. At this time, the current flowing between each of the first battery 16 and the second battery 18, and the first load 20 and the second load 22 passes through the precharge circuit 32. Therefore, the capacitor 20a of the first load 20 and the capacitor 22a of the second load 22 can be charged without damaging the capacitor 20a and the capacitor 22a.

[Power Supply after Precharging in Case of Occurrence of Abnormality in Main Circuit]

After precharging when an abnormality has occurred in the main circuit 12, the monitoring unit 62 controls the power source connection/disconnection units 26a and 26b and the load connection/disconnection units 28a and 28b of the main circuit 12 to establish a state described below. The monitoring unit 62 electrically disconnects the first battery 16 and the second battery 18 from the first power transmission bus 24; and the monitoring unit 62 electrically disconnects the first load 20 and the second load 22 from the first power transmission bus 24.

After precharging when an abnormality has occurred in the main circuit 12, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically connects the first battery 16 and the second battery 18 to the second power transmission bus 30, and at this time, the precharge circuit 32 is not interposed between the first battery 16 and the second battery 18 and the second power transmission bus 30. Further, the monitoring unit 62 electrically connects the first load 20 and the second load 22 to the second power transmission bus 30.

Accordingly, the power supply circuit 10 supplies power from the first battery 16 and the second battery 18 to the first load 20 and the second load 22, via the backup circuit 14. The current flowing between each of the first battery 16 and the second battery 18, and the first load 20 and the second load 22 does not pass through the precharge circuit 32. Therefore, the voltage applied to the first load 20 and the second load 22 can be increased. As a result, the first load 20 and the second load 22 can be driven.

[Operational Effects]

Figure 6:
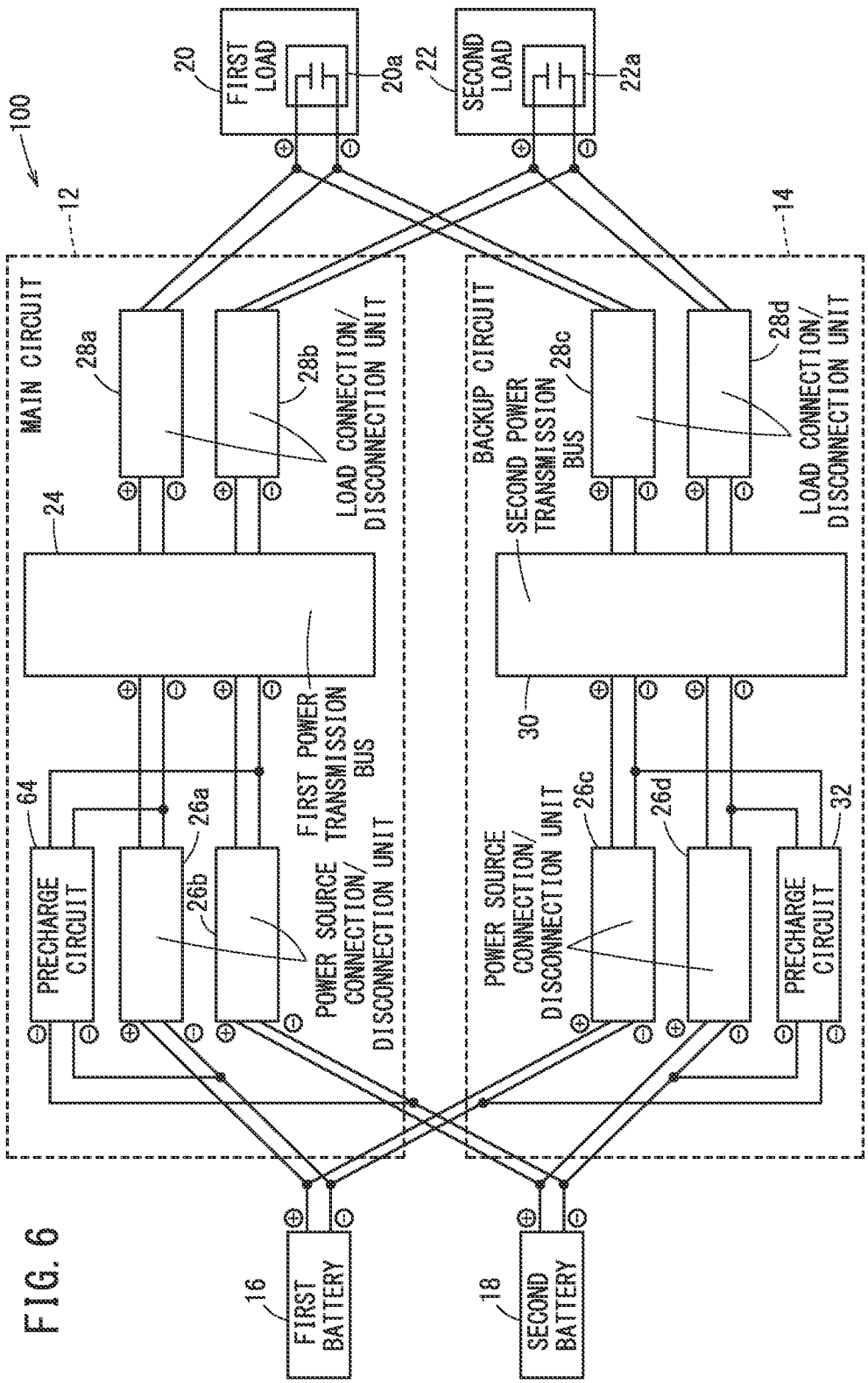
FIG. 6 is a circuit diagram of a power supply circuit of a comparative example.

FIG. 6 is a circuit diagram of a power supply circuit 100 according to a comparative example. In the comparative example, a precharge circuit 32 is provided in the backup circuit 14, and another precharge circuit 64 is provided in the main circuit 12. For example, when the power supply circuit 100 is used for an electric airplane or the like, the power supply circuit 100 supplies high-voltage and large-current power. This increases the weight, size, and cost of the precharge circuits 32 and 64. Accordingly, the power supply circuit 100 becomes heavier, the size becomes larger, and the cost becomes higher.

By omitting one of the precharge circuit 64 of the main circuit 12 or the precharge circuit 32 of the backup circuit 14 from the power supply circuit 100, the weight of the power supply circuit 100 can be reduced, the size can be reduced, and the cost can be reduced. Hereinafter, a case where the precharge circuit 32 of the backup circuit 14 is omitted from the power supply circuit 100 will be considered.

When an abnormality has occurred in the main circuit 12, the power supply circuit 100 supplies power from each of the first battery 16 and the second battery 18 to the first load 20 and the second load 22 via the backup circuit 14. The frequency of use of the main circuit 12 is higher than the frequency of use of the backup circuit 14. Therefore, the possibility that an abnormality occurs in the main circuit 12 is higher than the possibility that an abnormality occurs in the backup circuit 14.

In a case where the main circuit 12, which is likely to suffer from an abnormality, contains the precharge circuit 64, there is a high possibility that the power supply circuit 100 fails to supply power from each of the first battery 16 and the second battery 18 to the first load 20 and the second load 22 through the precharge circuit 64 during precharging. Therefore, there is a possibility that, during precharging, a large current flowing through the first load 20 and the second load 22 may cause damage to circuits of the first load 20 and the second load 22.

As such, in the power supply circuit 10 of the present embodiment, the precharge circuit 32 is provided only in the backup circuit 14. Since the precharge circuit 32 is provided only in the backup circuit 14, the weight, size and cost of the power supply circuit 10 can be reduced.

The possibility of an abnormality occurring in the backup circuit 14 is lower than the possibility of an abnormality occurring in the main circuit 12. Therefore, the power supply circuit 10 can reduce the possibility that, during precharging, power is supplied from the first battery 16 and the second battery 18 to the first load 20 and the second load 22 without passing through the precharge circuit 32. Therefore, it is possible to reduce the possibility of damage to the circuits of the first load 20 and the second load 22 during precharging.

In the power supply circuit 10 of the present embodiment, during precharging, power is supplied from each of the first battery 16 and the second battery 18 to the first load 20 and the second load 22. At this time, in the power supply circuit 10, power is supplied from each of the first battery 16 and the second battery 18 to the first load 20 and the second load 22 via the precharge circuit 32 of the backup circuit 14. Due to the above configuration, even when an abnormality such as a short circuit has occurred in the main circuit 12 and electric charge in the capacitor 20*a* of the first load 20 and the capacitor 22*a* of the second load 22 are lost, the capacitors 20*a* and 22*a* can be recharged by using the precharge circuit 32 of the backup circuit 14. Therefore, it is possible to eliminate the precharge circuit from the main circuit 12 while securing the function of recharging the capacitors 20*a* and 22*a* in a case of occurrence of an abnormality in the main circuit 12. As a result, the weight, size and cost of the power supply circuit 10 can be reduced.

[Other Circuit Configuration of Power Supply Circuit]

Figure 7:
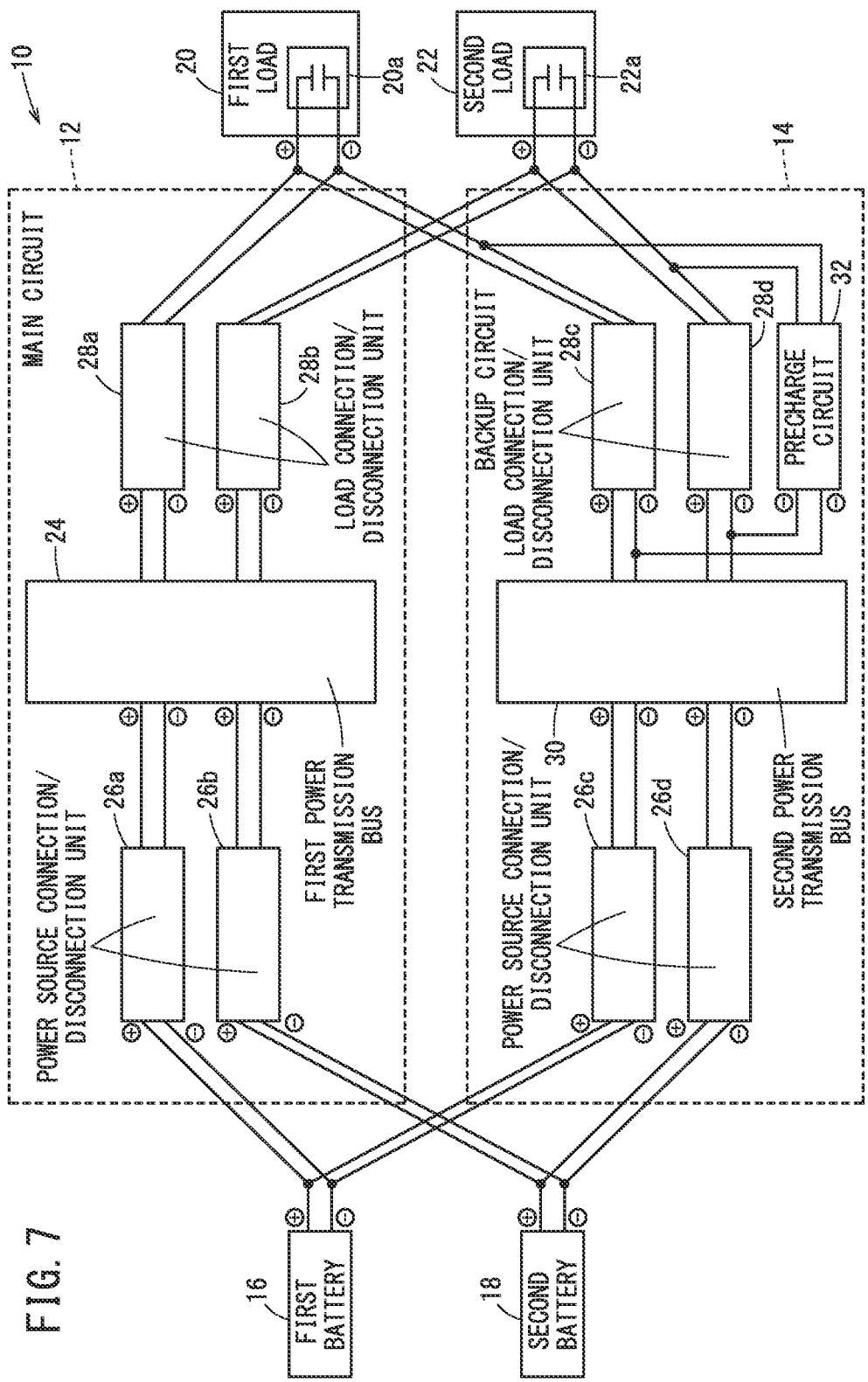
FIG. 7 is a circuit diagram of a power supply circuit.
Figure 8:
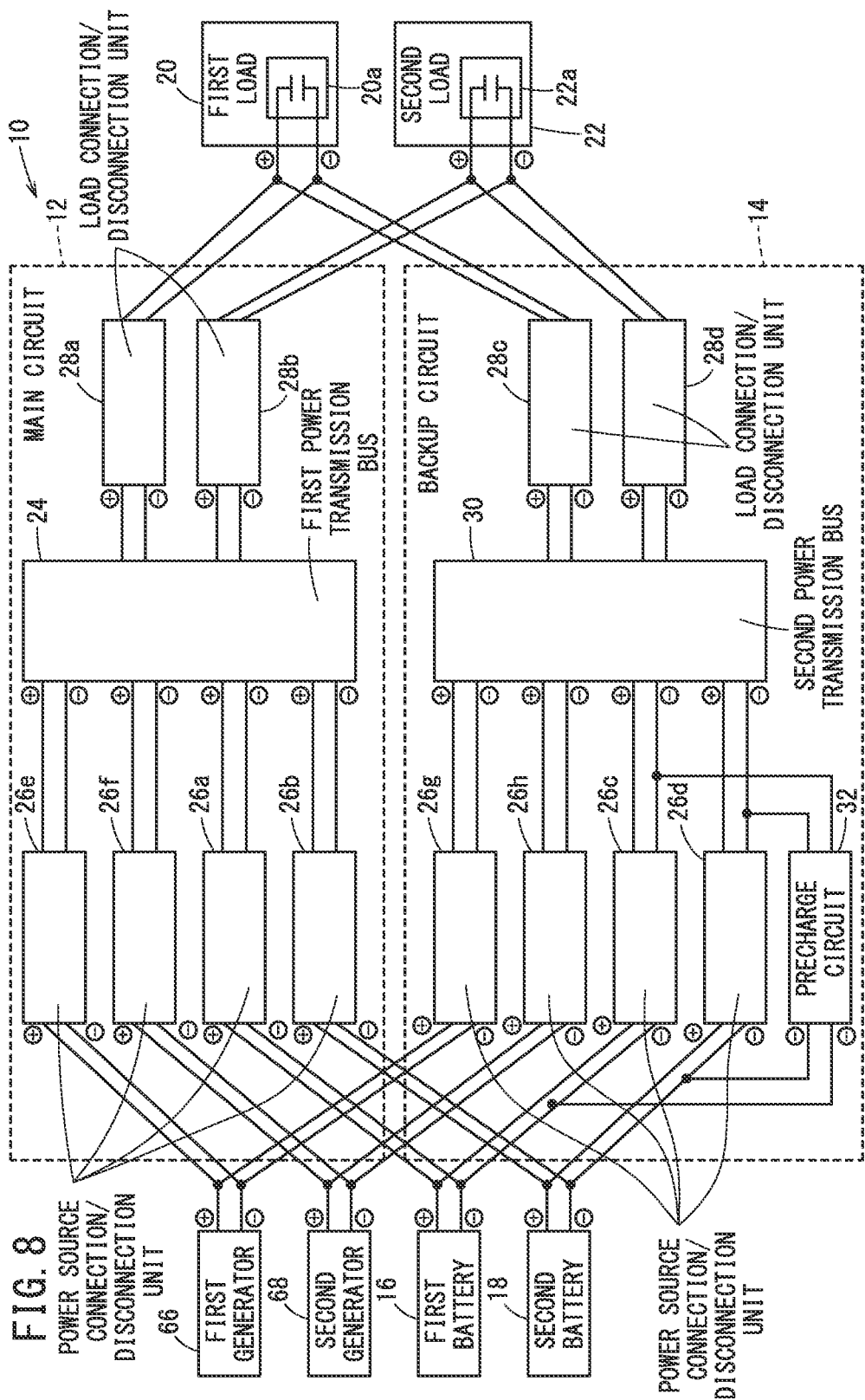
FIG. 8 is a circuit diagram of a power supply circuit.

The circuit configuration of the power supply circuit 10 may be a circuit configuration other than the circuit configuration shown in FIG. 1. FIGS. 7 and 8 are circuit diagrams of the power supply circuit 10.

In the power supply circuit 10 shown in FIG. 1, the precharge circuit 32 is connected in parallel with the power source connection/disconnection units 26*c* and 26*d*. Alternatively, as shown in FIG. 7, a precharge circuit 32 may be connected in parallel with the load connection/disconnection units 28*c* and 28*d*.

In the power supply circuit 10 shown in FIG. 1, the first battery 16 and the second battery 18 are connected as power sources. Alternatively, as shown in FIG. 8, a first generator 66 and a second generator 68 may be further connected to the power supply circuit 10.

In this case, the main circuit 12 is further provided with power source connection/disconnection units 26*e* and 26*f*. The power source connection/disconnection unit 26*e* is provided in a wiring that connects the first generator 66 and the first power transmission bus 24. The power source connection/disconnection unit 26*e* switches between a state in which the first generator 66 and the first power transmission bus 24 are electrically connected and a state in which the first generator 66 and the first power transmission bus 24 are electrically disconnected. The power source connection/disconnection unit 26*f* is provided in a wiring that connects the second generator 68 and the first power transmission bus 24. The power source connection/disconnection unit 26*f* switches between a state in which the second generator 68 and the first power transmission bus 24 are electrically connected and a state in which the second generator 68 and the first power transmission bus 24 are electrically disconnected.

The backup circuit 14 is further provided with a power source connection/disconnection unit 26*g* and a power source connection/disconnection unit 26*h*. The power source connection/disconnection unit 26*g* is provided in a wire connecting the first generator 66 and the second power transmission bus 30. The power source connection/disconnection unit 26*g* switches between a state in which the first generator 66 and the second power transmission bus 30 are electrically connected and a state in which the first generator 66 and the second power transmission bus 30 are electrically disconnected. The power source connection/disconnection unit 26*h* is provided in a wire connecting the second generator 68 and the second power transmission bus 30. The power source connection/disconnection unit 26*h* switches between a state in which the second generator 68 and the second power transmission bus 30 are electrically connected and a state in which the second generator 68 and the second power transmission bus 30 are electrically disconnected.

The power supply circuit 10 may be connected to one battery or three or more batteries. Further, the power supply circuit 10 may be connected to one generator or three or more generators. Further, the power supply circuit 10 may be connected to one load, or three or more loads.

The power supply circuit 10 may further include another circuit in addition to the main circuit 12 and the backup circuit 14. In this case, the different circuit has a power transmission bus different from the first power transmission bus 24 and the second power transmission bus 30.

Instead of the first battery 16 and the second battery 18, a large-capacitance capacitor may be connected to the power supply circuit 10.

The number of precharge circuits 32 and the number of resistors in the precharge circuit 32 are appropriately set according to the power source voltage, the resistance values of various resistors, the allowable current of the capacitor in each load, and the like. Therefore, the precharge circuit 32 may be provided on the power source side as shown in FIG. 1 while also on the load side as shown in FIG. 7 in accordance with the power source voltage, the resistance values of the various resistors, the allowable current of the capacitor in each load, and the like.

Second Embodiment

Figure 9:
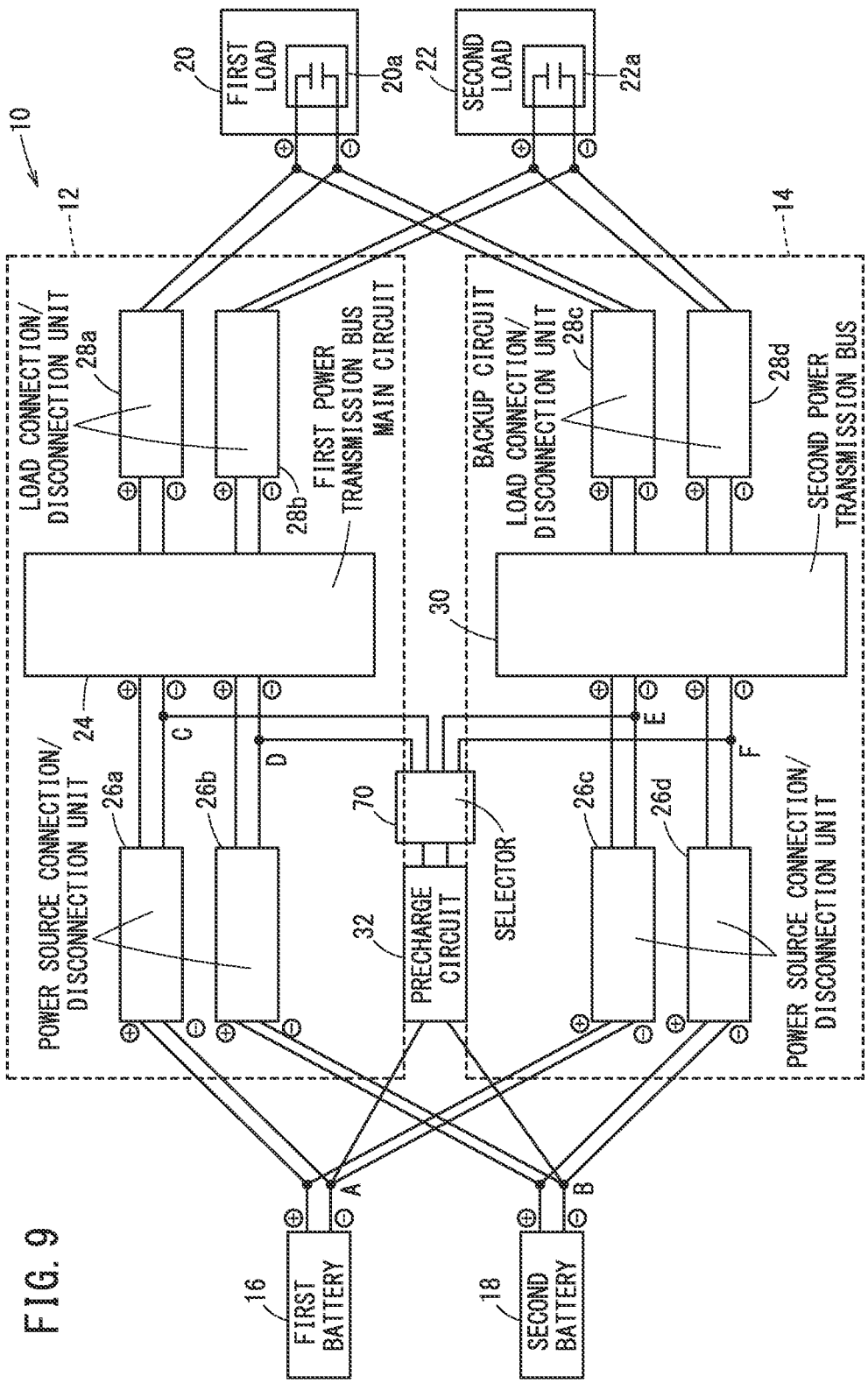
FIG. 9 is a circuit diagram of a power supply circuit.

FIG. 9 is a circuit diagram of a power supply circuit 10 according to the present embodiment. In the power supply circuit 10 according to the first embodiment, the precharge circuit 32 is provided in the backup circuit 14. In the present embodiment, a selector 70 is connected in series with the precharge circuit 32. The precharge circuit 32 is selectively connected to the main circuit 12 or the backup circuit 14 by the selector 70. The circuit configuration other than such a circuit configuration is the same as the circuit configuration of the power supply circuit 10 according to the first embodiment shown in FIG. 1.

As shown in FIG. 9, the precharge circuit 32 is connected at a point A to a negative wiring that connects the first battery 16 and the power source connection/disconnection unit 26*a* of the main circuit 12. As shown in FIG. 9, the precharge circuit 32 is connected at the point A to the negative wiring that connects the first battery 16 and the power source connection/disconnection unit 26*c* of the backup circuit 14. Further, as shown in FIG. 9, the precharge circuit 32 is connected at a point B to a negative wiring connecting the second battery 18 and the power source connection/disconnection unit 26*b* of the main circuit 12. As shown in FIG. 9, the precharge circuit 32 is connected at the point B to the negative wiring that connects the second battery 18 and the power source connection/disconnection unit 26*d* of the backup circuit 14.

As illustrated in FIG. 9, the precharge circuit 32 is connected to the negative wiring that connects the power source connection/disconnection unit 26*a* and the first power transmission bus 24, via the selector 70. More specifically, the precharge circuit 32 is connected at a point C to the negative wiring that connects the power source connection/disconnection unit 26*a* and the first power transmission bus 24. As illustrated in FIG. 9, the precharge circuit 32 is connected to the negative wiring that connects the power source connection/disconnection unit 26*b* and the first power transmission bus 24, via the selector 70. To be more specific, the precharge circuit 32 is connected at a point D to the negative wiring that connects the power source connection/disconnection unit 26b and the first power transmission bus 24. As illustrated in FIG. 9, the precharge circuit 32 is connected to the negative wiring that connects the power source connection/disconnection unit 26c and the second power transmission bus 30, via the selector 70. To be more specific, the precharge circuit 32 is connected at a point E to the negative wiring that connects the power source connection/disconnection unit 26c and the second power transmission bus 30. As illustrated in FIG. 9, the precharge circuit 32 is connected to the negative wiring that connects the power source connection/disconnection unit 26d and the second power transmission bus 30, via the selector 70. To be more specific, the precharge circuit 32 is connected at a point F to the negative wiring that connects the power source connection/disconnection unit 26d and the second power transmission bus 30.

Figure 10A:
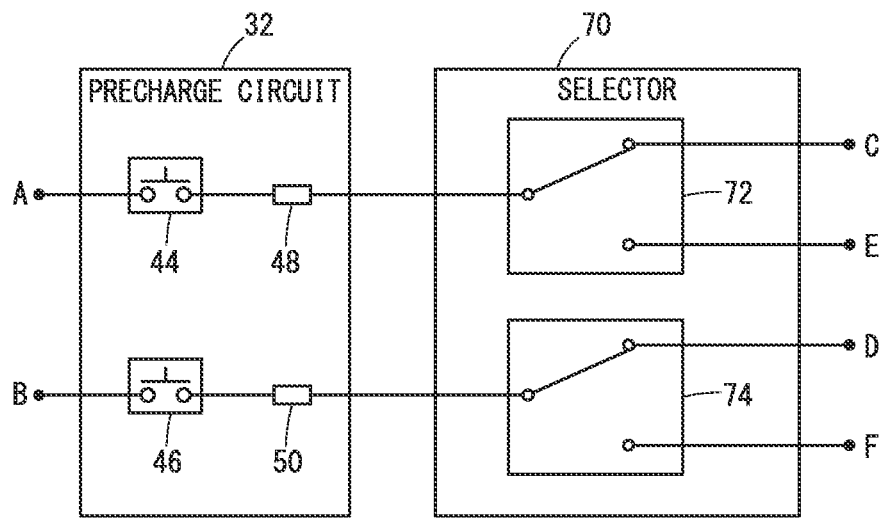
FIGS. 10A and 10B are diagrams showing the circuit configurations of a precharge circuit and a selector.
Figure 10B:
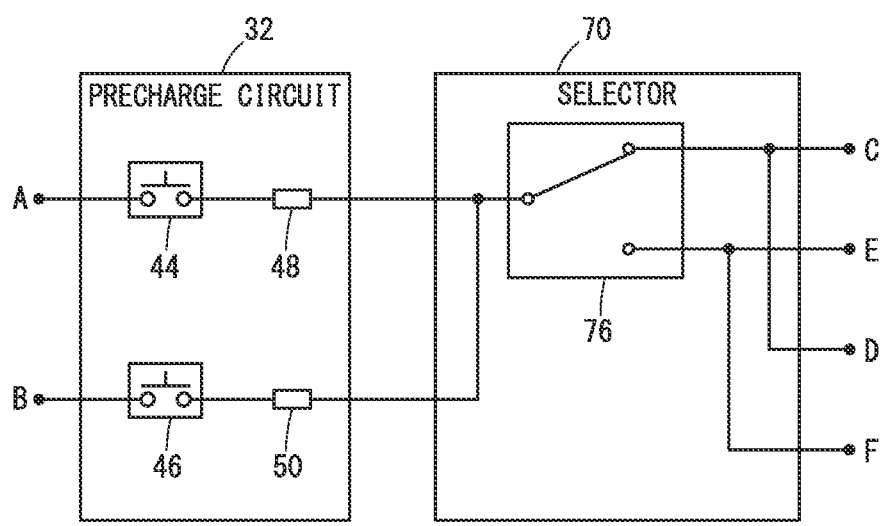

FIGS. 10A and 10B show the circuit configurations of the precharge circuit 32 and the selector 70. As shown in FIG. 10A, the selector 70 includes a switch 72 and a switch 74. The switch 72 selectively connects the wiring connected to the point A, via the precharge circuit 32 to the point C or the point E. The switch 74 selectively connects the wiring connected to the point B, via the precharge circuit 32 to the point D or the point F.

When the points A and C are connected by the selector 70 and the points B and D are connected by the selector 70, the precharge circuit 32 is connected to the main circuit 12. When the points A and E are connected by the selector 70 and the points B and F are connected by the selector 70, the precharge circuit 32 is connected to the backup circuit 14.

The circuit configuration of the selector 70 is not limited to the configuration shown in FIG. 10A, and may be another configuration. As shown in FIG. 10B, the selector 70 has one switch 76. The switch 76 selectively connects the wiring connected to the point A and the point B, via the precharge circuit 32 to both the point C and the point D or both the point E and the point F.

Figure 11:
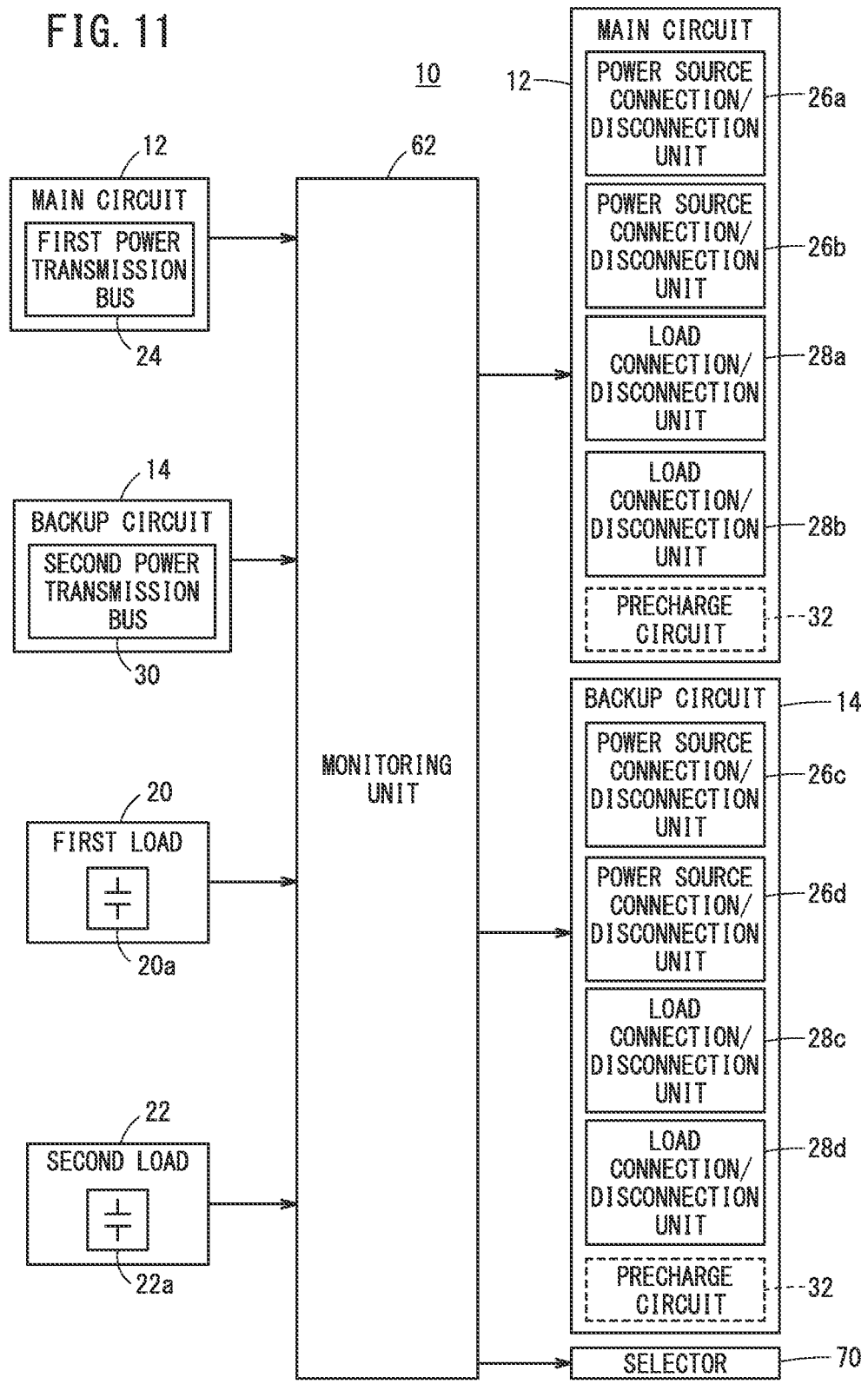
FIG. 11 is a block diagram of a power supply circuit.

FIG. 11 is a block diagram of the power supply circuit 10. The monitoring unit 62 of the present embodiment monitors an abnormality of the first power transmission bus 24 and the second power transmission bus 30, similarly to the monitoring unit 62 of the first embodiment. The monitoring unit 62 controls the selector 70 in addition to controlling the power source connection/disconnection unit 26, the load connection/disconnection unit 28, and the precharge circuit 32.

[Power Supply During Precharging]

Normally, the monitoring unit 62 controls the selector 70 to connect the precharge circuit 32 to the main circuit 12.

At the time of precharging, the monitoring unit 62 controls the power source connection/disconnection units 26a and 26b, the load connection/disconnection units 28a and 28b, and the precharge circuit 32 of the main circuit 12 to establish a state described below. The monitoring unit 62 electrically connects the first battery 16 and the second battery 18 to the first power transmission bus 24 via the precharge circuit 32; and the monitoring unit 62 electrically connects the first load 20 and the second load 22 to the first power transmission bus 24.

At the time of precharging, the monitoring unit 62 controls the power source connection/disconnection units 26c and 26d and the load connection/disconnection units 28c and 28d of the backup circuit 14 to establish a state described below. The monitoring unit 62 electrically disconnects the first battery 16 and the second battery 18 from the second power transmission bus 30; and the monitoring unit 62 electrically disconnects the first load 20 and the second load 22 from the second power transmission bus 30.

As a result, at the time of precharging, the power supply circuit 10 supplies power from the first battery 16 and the second battery 18 to the first load 20 and the second load 22 via the main circuit 12. At this time, the current flowing between each of the first battery 16 and the second battery 18, and the first load 20 and the second load 22 passes through the precharge circuit 32.

The voltage drop across the resistor of the precharge circuit 32 can reduce the voltage applied to the capacitor 20a of the first load 20 and the capacitor 22a of the second load 22. Accordingly, it is possible to suppress a large current from flowing through the capacitor 20a and the capacitor 22a. Therefore, the capacitor 20a of the first load 20 and the capacitor 22a of the second load 22 can be charged without damaging the capacitor 20a and the capacitor 22a.

At the time of precharging, the precharge circuit 32 is connected to the main circuit 12. The main circuit 12 at this time has the precharge circuit 32 and thus corresponds to the second circuit of the present invention.

[Power Supply after Precharging]

After precharging, the monitoring unit 62 controls the selector 70 to connect the precharge circuit 32 to the backup circuit 14.

After precharging, the monitoring unit 62 controls the power source connection/disconnection units 26a and 26b and the load connection/disconnection units 28a and 28b of the main circuit 12 to establish a state described below. The monitoring unit 62 electrically connects the first battery 16 and the second battery 18 to the first power transmission bus 24; and the monitoring unit 62 electrically connects the first load 20 and the second load 22 to the first power transmission bus 24.

After precharging, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically disconnects the first battery 16 and the second battery 18 from the second power transmission bus 30; and the monitoring unit 62 electrically disconnects the first load 20 and the second load 22 from the second power transmission bus 30.

Thus, after precharging, the power supply circuit 10 supplies power from the first battery 16 and the second battery 18 to the first load 20 and the second load 22, via the main circuit 12. The current flowing between each of the first battery 16 and the second battery 18, and the first load 20 and the second load 22 does not pass through the precharge circuit 32. Therefore, the voltage applied to the first load 20 and the second load 22 can be increased. As a result, the first load 20 and the second load 22 can be driven.

After precharging, the precharge circuit 32 is not connected to the main circuit 12. At this time, the main circuit 12 does not include the precharge circuit 32 and thus corresponds to the first circuit of the present invention.

[Power Supply During Precharging in Case of Occurrence of Abnormality in Main Circuit]

When an abnormality has occurred in the main circuit 12, the monitoring unit 62 controls the selector 70 to connect the precharge circuit 32 to the backup circuit 14 during and after precharging.

During precharging when an abnormality has occurred in the main circuit 12, the monitoring unit 62 controls the power source connection/disconnection units 26a and 26b and the load connection/disconnection units 28a and 28b of the main circuit 12 to establish the following state: The monitoring unit 62 electrically disconnects the first battery 16 and the second battery 18 from the first power transmission bus 24; and the monitoring unit 62 electrically disconnects the first load 20 and the second load 22 from the first power transmission bus 24.

During precharging when an abnormality has occurred in the main circuit 12, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically connects the first battery 16 and the second battery 18 to the second power transmission bus 30 via the precharge circuit 32; and the monitoring unit 62 electrically connects the first load 20 and the second load 22 to the second power transmission bus 30.

Thus, during precharging when an abnormality has occurred in the main circuit 12, the power supply circuit 10 supplies power from the first battery 16 and the second battery 18 to the first load 20 and the second load 22, via the backup circuit 14. At this time, the current flowing between each of the first battery 16 and the second battery 18, and the first load 20 and the second load 22 passes through the precharge circuit 32. Therefore, the capacitor 20a of the first load 20 and the capacitor 22a of the second load 22 can be charged without damaging the capacitor 20a and the capacitor 22a.

[Power Supply after Precharging in Case of Occurrence of Abnormality in Main Circuit]

After precharging when an abnormality has occurred in the main circuit 12, the monitoring unit 62 controls the power source connection/disconnection units 26a and 26b and the load connection/disconnection units 28a and 28b of the main circuit 12 to establish a state described below. The monitoring unit 62 electrically disconnects the first battery 16 and the second battery 18 from the first power transmission bus 24; and the monitoring unit 62 electrically disconnects the first load 20 and the second load 22 from the first power transmission bus 24.

After precharging when an abnormality has occurred in the main circuit 12, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically connects the first battery 16 and the second battery 18 to the second power transmission bus 30; and the monitoring unit 62 electrically connects the first load 20 and the second load 22 to the second power transmission bus 30.

Thus, after precharging when an abnormality has occurred in the main circuit 12, the power supply circuit 10 supplies power from the first battery 16 and the second battery 18 to the first load 20 and the second load 22, via the backup circuit 14. The current flowing between each of the first battery 16 and the second battery 18, and the first load 20 and the second load 22 does not pass through the precharge circuit 32. Therefore, the voltage applied to the first load 20 and the second load 22 can be increased. As a result, the first load 20 and the second load 22 can be driven.

[Operational Effects]

The power supply circuit 10 according to the present embodiment includes a selector 70 that selectively connects the precharge circuit 32 to the main circuit 12 or the backup circuit 14. Thus, since one precharge circuit 32 is shared by the main circuit 12 and the backup circuit 14, the power supply circuit 10 can be reduced in weight, size, and cost.

[Other Circuit Configuration of Power Supply Circuit]

Figure 12:
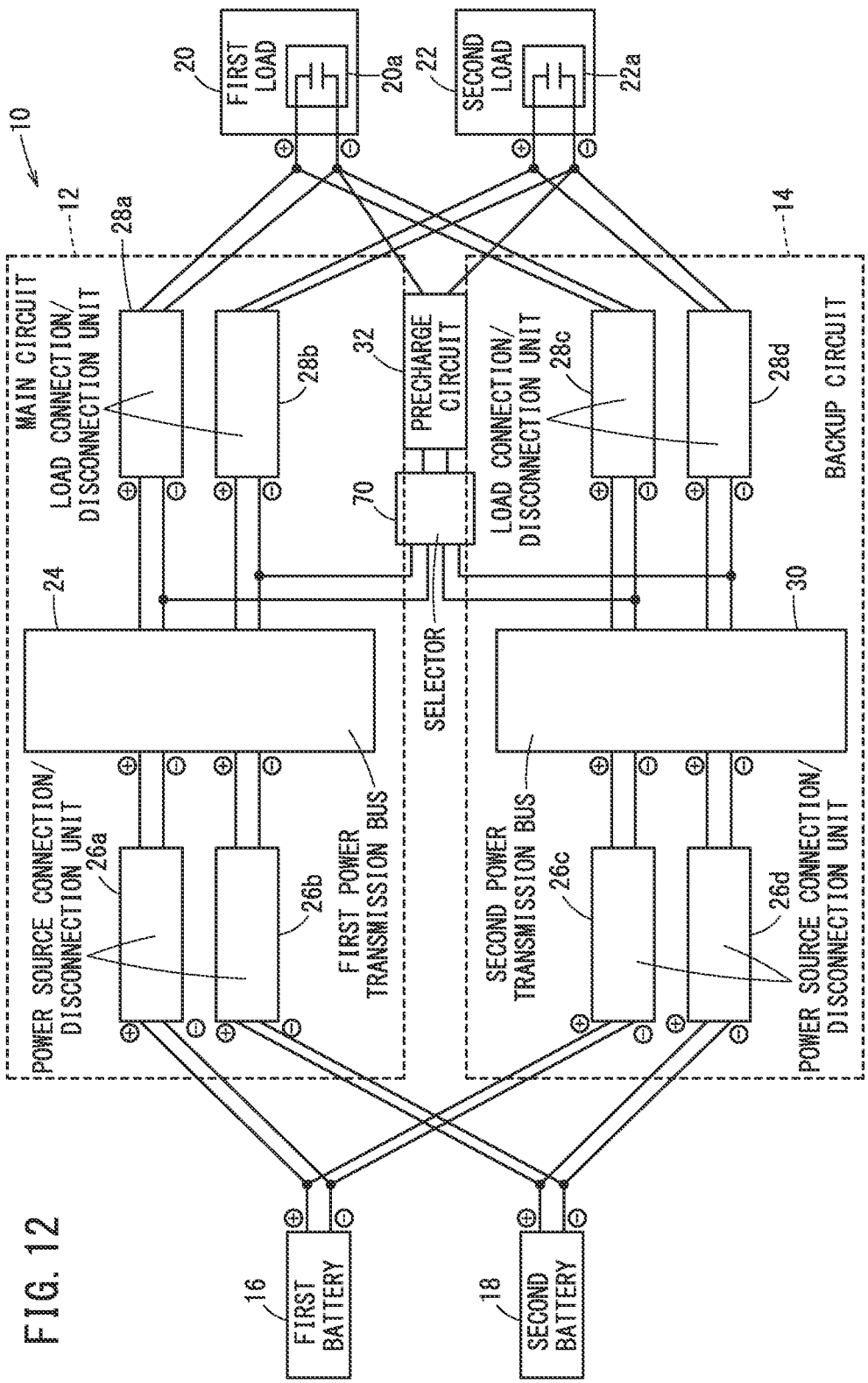
FIG. 12 is a circuit diagram of a power supply circuit.
Figure 13:
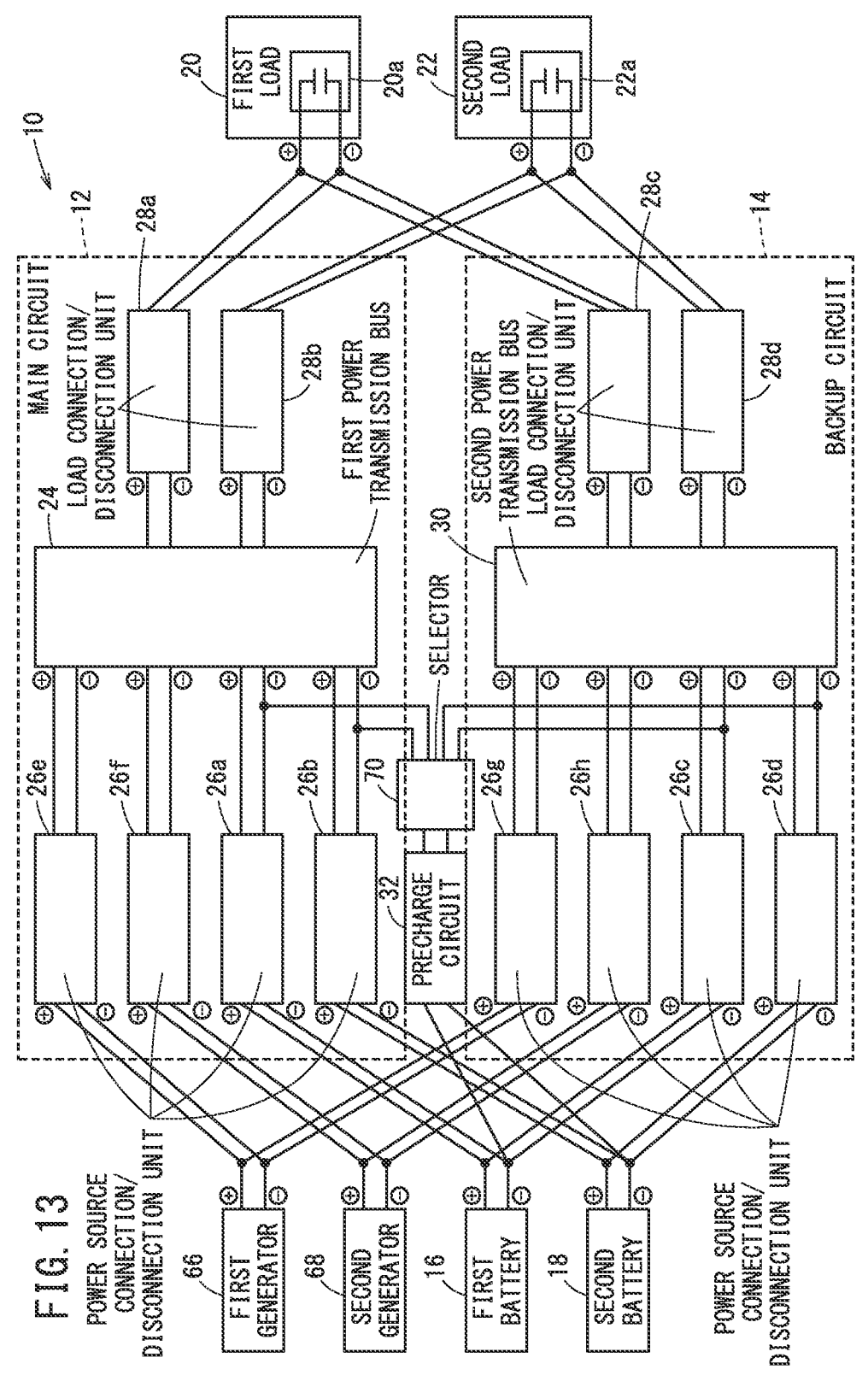

The circuit configuration of the power supply circuit 10 may be a circuit configuration other than the circuit configuration shown in FIG. 9. FIGS. 12 and 13 are circuit diagrams of the power supply circuit 10.

In the power supply circuit 10 shown in FIG. 9, the precharge circuit 32 is provided in parallel with the power source connection/disconnection units 26a and 26b of the main circuit 12 or the power source connection/disconnection units 26c and 26d of the backup circuit 14. On the other hand, as shown in FIG. 12, the precharge circuit 32 may be provided in parallel with the load connection/disconnection units 28a and 28b of the main circuit 12 or the load connection/disconnection units 28c and 28d of the backup circuit 14.

In the power supply circuit 10 shown in FIG. 9, the first battery 16 and the second battery 18 are connected as power sources. On the other hand, as shown in FIG. 13, the first generator 66 and the second generator 68 may be further connected to the power supply circuit 10.

In this case, the main circuit 12 is further provided with power source connection/disconnection units 26e and 26f. The power source connection/disconnection unit 26e is provided in a wiring that connects the first generator 66 and the first power transmission bus 24. The power source connection/disconnection unit 26e switches between a state in which the first generator 66 and the first power transmission bus 24 are electrically connected and a state in which the first generator 66 and the first power transmission bus 24 are electrically disconnected. The power source connection/disconnection unit 26f is provided in a wiring that connects the second generator 68 and the first power transmission bus 24. The power source connection/disconnection unit 26f switches between a state in which the second generator 68 and the first power transmission bus 24 are electrically connected and a state in which the second generator 68 and the first power transmission bus 24 are electrically disconnected.

The backup circuit 14 is further provided with a power source connection/disconnection unit 26g and a power source connection/disconnection unit 26h. The power source connection/disconnection unit 26g is provided in a wire connecting the first generator 66 and the second power transmission bus 30. The power source connection/disconnection unit 26g switches between a state in which the first generator 66 and the second power transmission bus 30 are electrically connected and a state in which the first generator 66 and the second power transmission bus 30 are electrically disconnected. The power source connection/disconnection unit 26h is provided in a wire connecting the second generator 68 and the second power transmission bus 30. The power source connection/disconnection unit 26h switches between a state in which the second generator 68 and the second power transmission bus 30 are electrically connected and a state in which the second generator 68 and the second power transmission bus 30 are electrically disconnected.

Third Embodiment

The configuration of the power supply circuit 10 of the present embodiment is the same as that of the power supply circuit 10 of the second embodiment. In a normal state, the power supply circuit 10 of the second embodiment supplies power from the first battery 16 and the second battery 18 to the first load 20 and the second load 22 via the main circuit 12 both during precharging and also after precharging. The power supply circuit 10 according to the present embodiment switches a circuit that supplies power from the first battery 16 and the second battery 18 to the first load 20 and the second load 22, between the main circuit 12 and the backup circuit 14, in accordance with the frequency of use or the usage time of the main circuit 12 and the backup circuit 14.

The monitoring unit 62 according to the present embodiment monitors the frequency of use or usage time of each of the main circuit 12 and the backup circuit 14. The monitoring unit 62 controls the power source connection/disconnection unit 26, the load connection/disconnection unit 28, the precharge circuit 32, and the selector 70 to use one of the main circuit 12 or the backup circuit 14 to supply power from the first battery 16 and the second battery 18 to the first load 20 and the second load 22.

[Power Supply by Main Circuit During Precharging]

At the time of precharging, the monitoring unit 62 controls the selector 70 to connect the precharge circuit 32 to the main circuit 12.

At the time of precharging, the monitoring unit 62 controls the power source connection/disconnection units 26a and 26b, the load connection/disconnection units 28a and 28b, and the precharge circuit 32 of the main circuit 12 to establish a state described below. The monitoring unit 62 electrically connects the first battery 16 and the second battery 18 to the first power transmission bus 24 via the precharge circuit 32; and the monitoring unit 62 electrically connects the first load 20 and the second load 22 to the first power transmission bus 24.

At the time of precharging, the monitoring unit 62 controls the power source connection/disconnection units 26c and 26d and the load connection/disconnection units 28c and 28d of the backup circuit 14 to establish a state described below. The monitoring unit 62 electrically disconnects the first battery 16 and the second battery 18 from the second power transmission bus 30; and the monitoring unit 62 electrically disconnects the first load 20 and the second load 22 from the second power transmission bus 30.

This allows the power supply circuit 10 to supply power from the first battery 16 and the second battery 18 to the first load 20 and the second load 22 via the precharge circuit 32 of the main circuit 12. Then, the capacitor 20a of the first load 20 and the capacitor 22a of the second load 22 are charged.

[Power Supply by Main Circuit after Precharging]

After precharging, the monitoring unit 62 controls the selector 70 to connect the precharge circuit 32 to the backup circuit 14.

After precharging, the monitoring unit 62 controls the power source connection/disconnection units 26a and 26b and the load connection/disconnection units 28a and 28b of the main circuit 12 to establish a state described below. The monitoring unit 62 electrically connects the first battery 16 and the second battery 18 to the first power transmission bus 24; and the monitoring unit 62 electrically connects the first load 20 and the second load 22 to the first power transmission bus 24.

At the time of precharging, the monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically disconnects the first battery 16 and the second battery 18 from the second power transmission bus 30; and the monitoring unit 62 electrically disconnects the first load 20 and the second load 22 from the second power transmission bus 30.

Accordingly, the power supply circuit 10 supplies power from the first battery 16 and the second battery 18 to the first load 20 and the second load 22 via the main circuit 12. Therefore, the first load 20 and the second load 22 can be driven.

[Power Supply by Backup Circuit During Precharging]

At the time of precharging, the monitoring unit 62 controls the selector 70 to connect the precharge circuit 32 to the backup circuit 14.

At the time of precharging, the monitoring unit 62 controls the power source connection/disconnection units 26a and 26b and the load connection/disconnection units 28a and 28b of the main circuit 12 to establish a state described below. The monitoring unit 62 electrically disconnects the first battery 16 and the second battery 18 from the first power transmission bus 24; and the monitoring unit 62 electrically disconnects the first load 20 and the second load 22 from the first power transmission bus 24.

The monitoring unit 62 controls the power source connection/disconnection units 26c and 26d, the load connection/disconnection units 28c and 28d, and the precharge circuit 32 of the backup circuit 14 to establish a state described below. The monitoring unit 62 electrically connects the first battery 16 and the second battery 18 to the second power transmission bus 30 via the precharge circuit 32; and the monitoring unit 62 electrically connects the first load 20 and the second load 22 to the second power transmission bus 30.

This enables the power supply circuit 10 to supply power from the first battery 16 and the second battery 18 to the first load 20 and the second load 22 via the precharge circuit 32 of the backup circuit 14. Therefore, the capacitor 20a of the first load 20 and the capacitor 22a of the second load 22 can be charged.

[Power Supply by Backup Circuit after Precharging]

After precharging, the monitoring unit 62 controls the selector 70 to connect the precharge circuit 32 to the main circuit 12.

After precharging, the monitoring unit 62 controls the power source connection/disconnection units 26a and 26b, the load connection/disconnection units 28a and 28b, and the precharge circuit 32 of the main circuit 12 to establish a state described below. The monitoring unit 62 electrically disconnects the first battery 16 and the second battery 18 from the first power transmission bus 24; and the monitoring unit 62 electrically disconnects the first load 20 and the second load 22 from the first power transmission bus 24.

The monitoring unit 62 controls the power source connection/disconnection units 26c and 26d and the load connection/disconnection units 28c and 28d of the backup circuit 14 to establish a state described below. The monitoring unit 62 electrically connects the first battery 16 and the second battery 18 to the second power transmission bus 30, and the monitoring unit 62 electrically connects the first load 20 and the second load 22 to the second power transmission bus 30.

Accordingly, the power supply circuit 10 supplies power from the first battery 16 and the second battery 18 to the first load 20 and the second load 22, via the backup circuit 14. Therefore, the first load 20 and the second load 22 can be driven.

[Operational Effects]

The power supply circuit 10 of the present embodiment switches a circuit that supplies power from the first battery 16 and the second battery 18 to the first load 20 and the second load 22, between the main circuit 12 and the backup circuit 14. This switching is performed according to the frequency of use or the usage time of the main circuit 12 and the backup circuit 14. As a result, the frequency of use or the usage time of the main circuit 12 and the frequency of use or the usage time of the backup circuit 14 can be brought close to each other, so that the durability of the power supply circuit 10 can be improved.

Technical Ideas Obtained from Embodiments

A description will be given below concerning technical concepts that are capable of being grasped from the above-described embodiments.

There is provided a power supply circuit (10) for supplying power from a power source (16, 18) to a load (20, 22), wherein the load includes a capacitor (20a, 22a) that needs to be charged before activation. The power supply circuit includes: a first circuit (12) configured to supply power from the power source to the load; and a second circuit (14) configured to supply power from the power source to the load. Only one of either the first circuit or the second circuit is provided with a precharge circuit (32) configured to charge the capacitor. When charging the capacitor, power is supplied from the power source to the load by using a circuit that is provided with the precharge circuit among the first circuit and the second circuit. After charging of the capacitor is completed, power is supplied from the power source to the load by using a circuit that is not provided with the precharge circuit among the first circuit and the second circuit.

In the above-described power supply circuit, the first circuit may be a circuit that is not provided with include the precharge circuit; the second circuit may be a circuit that is provided with the precharge circuit; and when the capacitor is charged in a case in which an abnormality has occurred in the first circuit, power may be supplied from the power source to the load by using the second circuit, and after charging of the capacitor is completed, power may be supplied from the power source to the load by using the second circuit.

The power supply circuit may further include a selector (70) configured to connect the precharge circuit to one of the first circuit or the second circuit.

The power supply circuit may further include a monitoring unit (62) configured to monitor at least one of a frequency of use or a usage time, of the first circuit and the second circuit, and the monitoring unit may connect the precharge circuit to one of the first circuit or the second circuit according to at least one of the frequency of use or the usage time.

The present invention is not particularly limited to the embodiment described above, and various modifications are possible without departing from the essence and gist of the present invention.

What is claimed is:

1. A power supply circuit for supplying power from a first power source and a second power source to a first load, wherein the first power source and the second power source are in a parallel configuration, wherein the load includes a capacitor that needs to be charged before activation, the power supply circuit comprising:
    a first circuit configured to supply power from the first power source to the load and from the second power source to the load; and
    a second circuit configured to supply power from the first power source to the load and from the second power source to the load;
    wherein:
    the first circuit and the second circuit are provided in parallel with each other;
    only one of either the first circuit or the second circuit is provided with a precharge circuit configured to charge the capacitor;
    when charging the capacitor, power is supplied from the first power source and the second power source to the load via a circuit that is provided with the precharge circuit provided to only one of the first circuit and the second circuit; and
    after charging of the capacitor is completed, power is supplied from the first power source and the second power source to the load via a circuit that is not provided with the precharge circuit provided to only one of the first circuit and the second circuit.

2. The power supply circuit according to claim 1, wherein:
    the first circuit is the circuit that is not provided with the precharge circuit;
    the second circuit is the circuit that is provided with the precharge circuit; and
    when the capacitor is charged in a case in which an abnormality has occurred in the first circuit, power is supplied from the first power source to the load by using the second circuit, and after charging of the capacitor is completed, power is supplied from the second power source to the load by using the second circuit.

3. The power supply circuit according to claim 1, further comprising a selector configured to connect the precharge circuit to one of the first circuit or the second circuit.

4. The power supply circuit according to claim 3, further comprising a monitoring unit configured to monitor at least one of a frequency of use or a usage time, of the first circuit and the second circuit,
    wherein the monitoring unit connects the precharge circuit to one of the first circuit or the second circuit according to at least one of the frequency of use or the usage time.

5. The power supply circuit according to claim 2, wherein the abnormality is a short-circuit of an electric wire of the first circuit.

6. The power supply circuit according to claim 2, wherein the abnormality is a short-circuit of a bus bar of the first circuit.

7. The power supply circuit according to claim 2, wherein the abnormality is a blowout of a fuse in the first circuit.

8. The power supply circuit according to claim 2, wherein the abnormality is a failure of a switch in the first circuit.

* * * * *